Sept. 20, 1949.　　　　A. R. WURTELE　　　　2,482,530
HARVESTER
Filed April 10, 1941　　　　　　　　　　　　　4 Sheets-Sheet 1
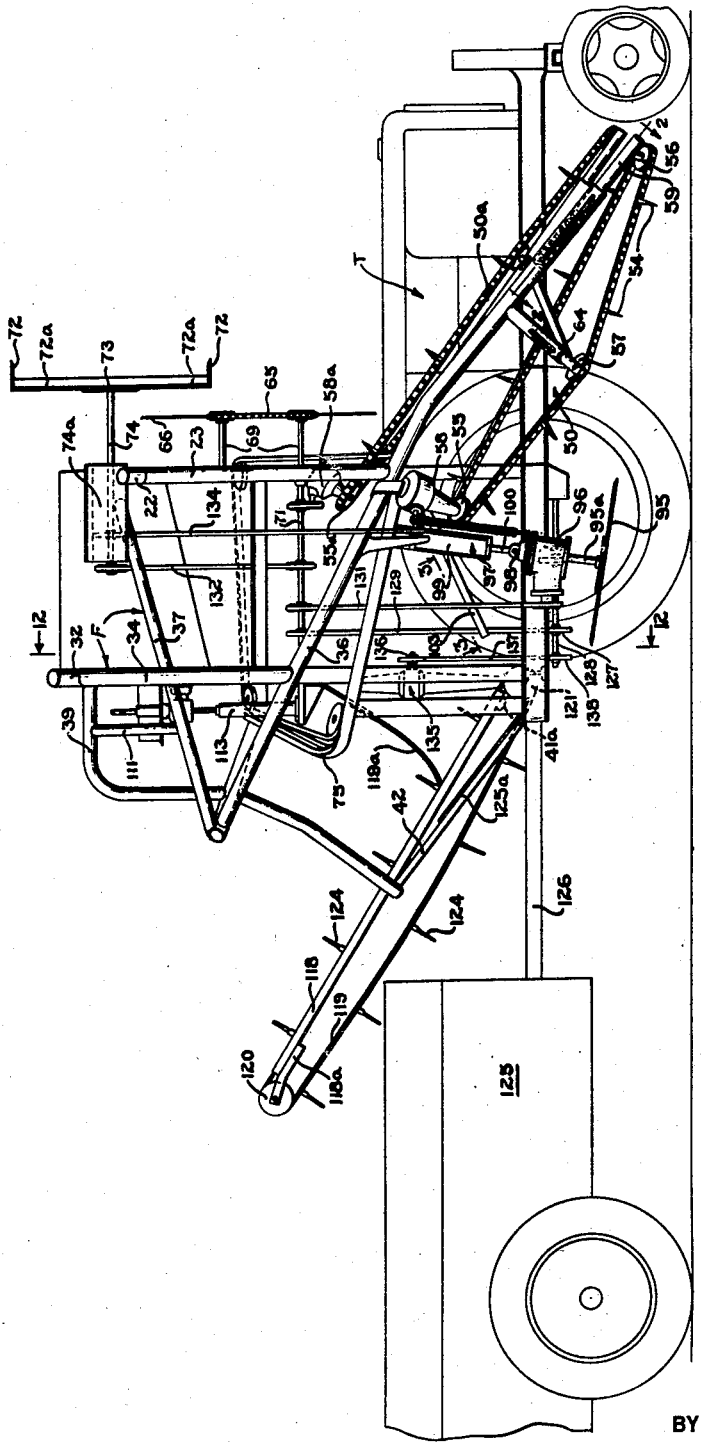
INVENTOR
Allan R. Wurtele
BY
F. Bascom Smith
ATTORNEY

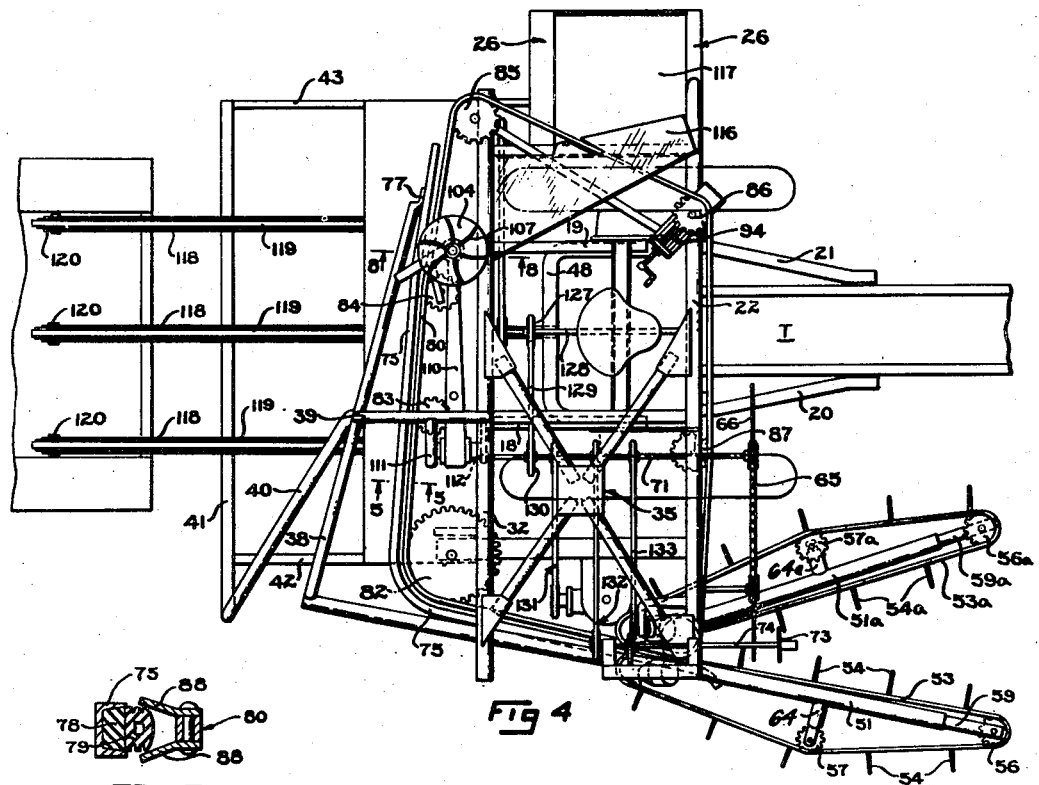

Sept. 20, 1949.  A. R. WURTELE  2,482,530
HARVESTER
Filed April 10, 1941  4 Sheets-Sheet 3

INVENTOR
Allan R. Wurtele
BY F. Bascom Smith
ATTORNEY

Sept. 20, 1949.　　　A. R. WURTELE　　　2,482,530
HARVESTER

Filed April 10, 1941　　　　　　　　　4 Sheets-Sheet 4

INVENTOR
Allan R. Wurtele
BY
F. Bascom Smith
ATTORNEY

Patented Sept. 20, 1949

2,482,530

UNITED STATES PATENT OFFICE 2,482,530

HARVESTER

Allan R. Wurtele, Mix, La.; Noemie Garrett Wurtele and N. P. Phillips, executors of said Allan R. Wurtele, deceased, assignors of one-half to Noemie Garrett Wurtele and one-half to Jeanna Wurtele Application April 10, 1941, Serial No. 387,813

7 Claims. (Cl. 56—157)

This invention relates to harvesters, and more particularly to power driven machinery adapted to harvest crops constituted by plants having elongated stalks, such as sugar cane, and like crops.

An object of the present invention is to provide a novel mechanical harvester by means of which sugar cane and similar crops may be rapidly and economically harvested.

Another object of the invention is to provide a mechanical harvester with novel means for conveying stalks through the several harvesting operations and novel apparatus for adjusting the conveying means.

Another object is to provide novel harvesting means which may be readily mounted on a four-wheel power driven vehicle, such as a standard tractor, and which may also be readily removed from said vehicle to make the latter available for other uses.

A further object is to provide a novel cane harvester adapted for harvesting sugar cane wherein a common source of power is employed for propelling the same along the ground and for driving the various operating parts thereof.

Still another object is to provide a cane harvester having novel means for stripping the foliage and foreign matter from the sugar bearing portion of the cane stalks.

A still further object is to provide novel loading apparatus in a harvesting machine for conveying plant stalks to and depositing the same in a cane-carrying vehicle.

Another object is to provide novel conveying means in a harvester which are adapted to support stalks of the plants being harvested in a substantially upright position during and after the cutting and topping thereof.

It is also an object of the invention to provide a novel harvester having novel driving and conveying means adapted to substantially obviate the probability of the same becoming clogged or jammed by leaves, vines, weeds, or other foliage.

Another object is to provide a harvester for cane and like crops which is openly constructed so that all operating parts are readily accessible and visible to an operator at all times.

A further object is the provision in a harvester of novel means for cutting the upper series of leaves or bush portion off the plants to be harvested and for systematically removing and accumulating the upper ends of the stalks of said plants.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a side view in elevation of a harvester embodying the present invention, said view having parts broken away or removed and parts, such as the driving and conveying chains and the sprockets therefor, shown diagrammatically;

Fig. 2 is an enlarged detail view, partly in section and partly in elevation, of a portion of the gathering conveyor means of the harvester;

Fig. 3 is an enlarged detail top plan view of one form of foliage removing means employed in carrying out the invention, the view being taken substantially along line 3—3 of Fig. 1;

Fig. 4 is a top plan view of the harvester, with parts broken away or removed and with other parts shown diagrammatically;

Fig. 5 is an enlarged detail sectional view of a stalk conveying mechanism, said view being taken substantially along line 5—5 of Fig. 4;

Fig. 6 is an enlarged detail top plan view of a form of mechanism for mounting and adjusting the cane conveying apparatus;

Fig. 7 is an enlarged detail sectional view of a conveyor chain sprocket and the mounting therefor, said view being taken substantially along line 7—7 of Fig. 6;

Fig. 8 is an enlarged detail sectional view through the axis of a cane topping mechanism, said view being taken substantially on line 8—8 of Fig. 4;

Fig. 9 is an enlarged detail top plan view, with parts broken away, of said cane topping mechanism;

Figures 10, 11:
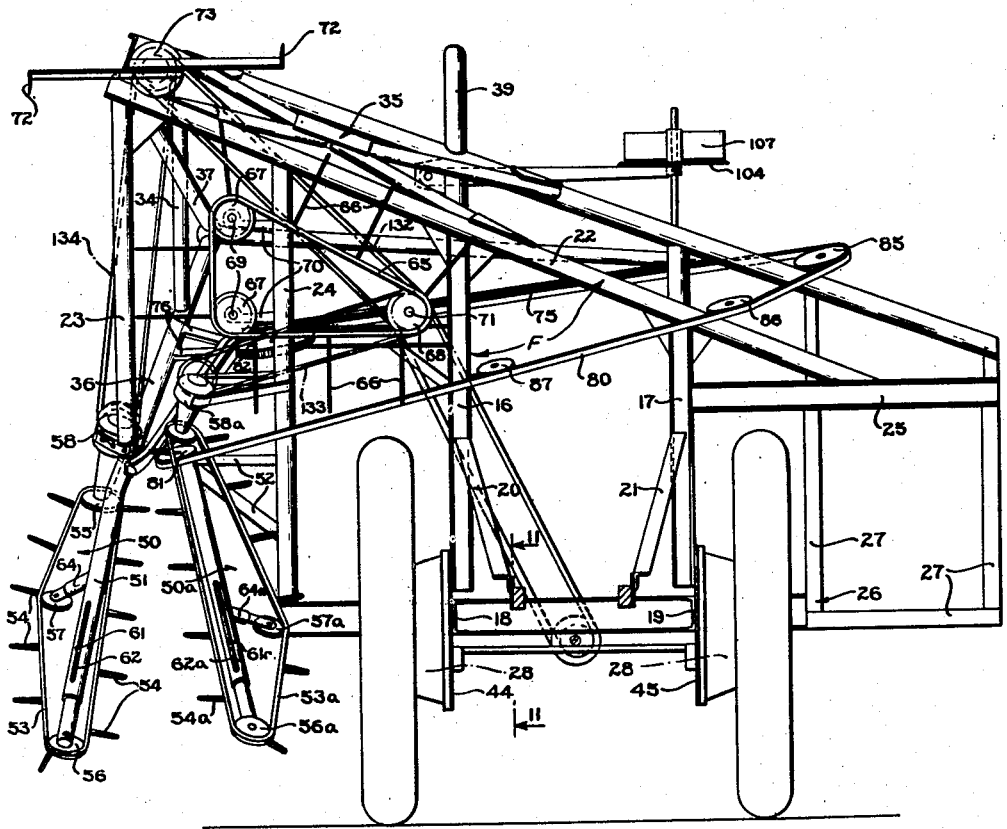
Fig. 10 is a front view in elevation of the harvester unit with parts removed and with tractor parts shown.
Fig. 11 is an enlarged detail side view, partly in elevation and partly in section, showing a part of the harvester supporting structure and the manner of attaching the structure to a tractor, said view being taken substantially along line 11—11 of Fig. 10.

In the drawings and particularly in Figs. 1, 4, 10 and 12, some parts of the harvester, because of the size and construction of the latter, have been removed or shown diagrammatically in the interest of clarity. All of the various parts of the harvester are shown, however, in at least one of these figures or shown in substantial detail in one of the other figures of the drawings.

In the form illustrated in the drawings, by way of example, the invention is shown as being embodied in a sugar cane harvester which comprises a comparatively open frame structure removably supported on the chassis of a four-wheel, power driven tractor of standard construction. The frame structure is built to accommodate and support means for gathering, bushing, stripping, cutting, conveying and topping the cane plants to be harvested. The driving mechanism or trains for all of the above-mentioned means are preferably driven by the prime mover which propels the tractor, thus making it unnecessary to provide more than a single power unit. The present invention provides novel gathering means for lifting cane stalks to a substantially vertical position to facilitate the cutting and stripping thereof. As the stalks approach a vertical position, the uppermost leaves thereof are cut off by cutting means, and leaves intermediate the ends of the stalks are stripped therefrom by novel stripping means. Each stalk is then gripped intermediate its ends by novel conveying mechanism which holds the same while it is being cut loose from its roots at a point near the ground by a cutting member. The stalks, after being cut, are conveyed in a nearly vertical position through novel stripping means, which are effective to remove leaves, vines, etc., from the lower ends of the stalks, and thence at substantially right angles to the direction of movement of the harvester to an adjustable topping cutter which cuts the top ends, or nubbins, from the stalks. These ends are directed to a box or bin, mounted on the opposite side of the tractor from the stalk cutting means, from which the nubbins may be periodically dumped and then readily gathered to be used for feeding livestock, such as cattle. The cane stalks which are now ready for the sugar mill are released by the conveyor and disposed in a horizontal position on a loading conveyor by which the same are elevated and deposited in a cane cart attached to the harvester.

In one form of harvester illustrated, the supporting frame F for the various operating parts is removably mounted on and secured to a standard McCormick-Deering Farmall tractor T (Figs. 1 and 4). The main supports of the harvester frame which are attached to the tractor consist of two vertical supporting members 16 and 17 (Figs. 10 and 11), and two rearwardly extending horizontal supporting members 18 and 19 (Figs. 4, 10 and 11), said members being preferably beams of standard cross-section and being removably connected, in a novel manner to be more fully disclosed hereafter, to rear wheel drive housings 28 of tractor T. A pair of braces 20 and 21 (Figs. 4 and 10) connect beams 16 and 17, respectively, to the chassis of the tractor to further support said beams. A cross beam or post 22 is secured to the upper ends of beams 16 and 17 and extends laterally across the tractor at an angle to the horizontal so as to have the higher end thereof to the left of the tractor as the latter is viewed from the front (Fig. 10), and said post constitutes the main top support for the harvester frame. Depending substantially vertically from post 22 on the left of tractor T are a pair of posts 23 and 24, and attached to the right end of post 22 and to substantially the center of beam 17 is a horizontal beam 25 from which members 27 of a bin supporting frame 26 depend (Fig. 10). The above and subsequent references to the location of structural parts in relation to the tractor are determined by viewing the tractor from the front, unless expressly indicated to be otherwise.

Figure 12:
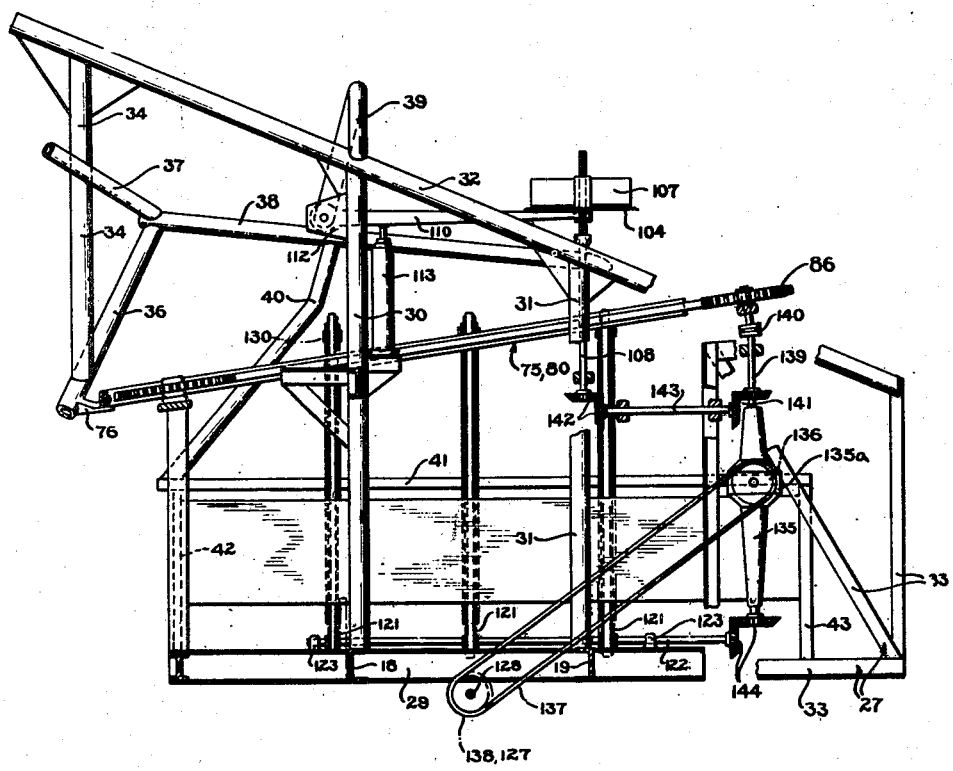
Fig. 12 is a sectional view of the harvester with parts removed, said view being taken substantially along line 12—12 of Fig. 1.

At the rear of the harvester, as best seen in Fig. 12, a horizontal beam 29 is secured across beams 18 and 19 and projects laterally beyond said beams in both directions. Rigidly secured thereto and extending upwardly therefrom are a pair of vertical posts 30 and 31 and said posts in turn support at the upper ends thereof a laterally extending post or beam 32, which slopes upwardly to the left (Fig. 12). Members 33 of bin supporting frame 27 are secured to the right end of post 32 and a vertical support 34 is attached to and extends downwardly from post 32 adjacent the left end of the latter.

The front portion of the above harvester frame comprising beams 16, 17 and post 22 and the rear portion comprising posts 30, 31 and 32 are joined together by an X-shaped truss 35 (Figs. 4 and 10). At the extreme left of the harvester, a side post 36 (Figs. 1 and 10) extending angularly downwardly from the rear to the front of the harvester is supported by members 23 and 34. Connected to the upper end of main post 22 and extending rearwardly and downwardly therefrom is a second side support 37 which is also secured to post 34 at a point intermediate the ends of the latter and at its lower end joins the upper end of side post 36. At this point of junction, the left end of a third member 38 is supported by the two side members 36 and 37 and said third member extends laterally and forwardly, being additionally supported by a brace 39 which connects the top post 32 to said third member. In order not to interfere with the conveyance of the harvested stalks in an upright position between posts 32 and 38, brace 39 is arch-shaped. Another supporting member 40 extends downwardly, rearwardly and laterally to the left from post 38 and supports one end of a substantially horizontal cross-bar 41, the latter being additionally supported by a pair of arms 42 and 43 extending rearwardly and upwardly from rear beam 29 and bin supporting frame 27, respectively.

The above-described reinforcing and supporting frame for the operating parts of the harvester is carried by the rear wheel drive housings 28 and reinforced by supporting braces 20 and 21 which are readily removable from the tractor chassis. Beams 16, 17, 18 and 19 are securely attached to rear wheel drive housings 28 by means of a pair of connecting plates 44 and 45 (Fig. 10), beams 16 and 18 being fixed to the left wheel plate 44 and beams 17 and 19 to right wheel plate 45. The plates are removably attached to housings 28 by suitable means, such as bolts 46, which preferably border a recess 47 provided in each of said plates to permit the latter to fit over the rear axle housing 28a. A draw-bar 48 (Figs. 4 and 11) is attached in the usual way to housings 28, and recesses 47 permit the connecting plates to be secured to said housings without affecting the draw-bar attachments. By means of this mounting, the harvester unit may be bodily removed from the tractor, allowing the latter to be utilized for other purposes when so desired.

Novel means are provided for gathering the stalks of cane of each row and lifting the same to a substantially vertical position in order that the stalks may be properly stripped, topped and cut. As shown, said means comprise a pair of forwardly and downwardly extending diverging gathering mechanisms 50 and 50a mounted on the left side of the harvester with the leading ends thereof adjacent the ground. The mechanisms are supported by a pair of diverging arms or posts 51, 51a, the former of said posts being an extension of side post 36 and the latter being fixed by braces 52 to beam 24. The mechanisms are of similar construction, except as hereafter pointed out, and accordingly only mechanism 50 is described in detail. Corresponding parts of both mechanisms are designated by like numerals with the addition of the letter a for the right-hand gatherer. An endless chain 53 having a plurality of substantially equally spaced projections or lugs 54 mounted thereon and extending substantially at right angles therefrom is carried on arm 51 by means of a plurality of sprockets 55, 56 and 57. Sprocket 55 of mechanism 50 and the corresponding sprocket 55a of mechanism 50a are operatively connected to driving means 58 and 58a more fully described hereafter, and chains 53 and 53a are moved thereby relative to the tractor. Brackets on uprights 23 and 24 support the driving means 58 and 58a, as shown in Fig. 10. Sprocket 55 is preferably mounted below arm 51 at the upper end thereof, and sprocket 55a is mounted above arm 51a at the upper end of the latter so that said chains move in different planes, being separated the greatest vertical distance (Fig. 1) at the point of maximum convergence of said arms (Fig. 4).

To minimize the possibility of damage to mechanisms 50 and 50a resulting from collision with obstacles in the path of the leading ends of said mechanisms, and to maintain chains 53, 53a taut, novel means for mounting the idler sprockets 56, 57 and 56a, 57a are provided. As shown, sprocket 56 is rotatably mounted on a rod 59 which is, in turn, slidably mounted in a recess 60 (Fig. 2) provided in the end of arm 51, said rod being equipped with a pin 61 which engages a slot 62 in arm 51 to limit the movement of said rod relative to said arm. Resilient means, such as coil spring 63, are provided between the end of rod 59 and the bottom wall of recess 60 to yieldingly urge said rod forward. When the leading end of mechanism 50 strikes an obstacle or the ground, rod 59 is caused to slide backward against the resistance of spring 63 a sufficient distance to clear the obstacle and prevent damage. This action normally renders chain 54 slack and to take up this slack sprocket 57 is preferably provided intermediate the ends of arm 51. Sprocket 57 is mounted for resiliently opposed telescopic action by means of apparatus 64 which is similar to the mounting for sprocket 56. During operation, it is desirable to move chains 53, 53a at a speed which has a component in the direction of movement of the harvester substantially equal to the forward speed of tractor T so that the stalks engaged by projections 54, 54a, if growing at a lateral angle, are lifted thereby to a substantially vertical position.

Novel means are provided for stripping some of the leaves from the central portions of the stalks as the latter are erected by gathering chains 53, 53a and, in the form shown, said means comprise an endless chain or belt 65 (Figs. 1 and 10) having rigid elements or blades 66 mounted thereon, said elements extending substantially at right angles from said chain. The latter is preferably supported and driven by means comprising two idler sprockets 67 and one driving sprocket 68, sprockets 67 being located adjacent the path of the stalks so that blades 66 intercept the stalk path in such a manner as to cut and strip foliage from the stalks. Sprockets 67 are mounted on vertically spaced shafts 69, which are suitably journaled in bearings carried by brackets 70, the latter being fixed to beam 24 (Fig. 10), and drive sprocket 68 is mounted to the right of said idler sprockets on a drive shaft 71. As a result, chain 65 travels downwardly in a vertical path for a substantial distance and stripping elements 66 strip the stalk for a substantial length thereof.

In order to remove the uppermost leaves or bush portions of the stalks of cane, means are provided for cutting said leaves off and throwing the same clear of the harvester. In the form shown, said cutting means comprise a pair of knives 72, 72 (Figs. 1 and 10) mounted on the outer ends of arms 72a which are, in turn, adjustably secured to a shaft 74 for rotation therewith, knives 72 being mounted with the cutting edges thereof extending in the direction of rotation of the latter. Shaft 74 is journaled in suitable bearings mounted on a bracket 74a carried on front post 22 and is driven by means to be described hereafter.

After each stalk of cane is stripped and topped by the means above-described, the central portion thereof is individually gripped by a novel conveyor mechanism, the entrance to which is located above and between the converging upper ends of gathering mechanisms 50 and 50a. As shown, the conveyor mechanism comprises a channel member 75 (Figs. 1, 5 and 10) which extends rearwardly and upwardly along the side and then transversely across the rear of tractor T, said member being supported by a plurality of brackets 76 connected to post 36 and by a bracket 77 formed at the right end of post 38. A strip of yieldable material, such as rubber, preferably consisting of a solid portion 78 and a hollow portion 79 (Fig. 5) is carried in said channel member between the flanges thereof with hollow portion 79 projecting beyond the edge of said flanges, said portions 78 and 79 being suitably fixed to each other and to said channel members, for example, by vulcanizing.

A movable conveyor member, such as an endless chain 80, is mounted with a portion thereof adjacent and parallel to resilient member 79 for cooperation therewith, said chain portion and member being normally separated a distance approximately equal to the diameter of the cane stalks being harvested. Chain 80 is supported by a plurality of sprockets 81, 82, 83, 84, 85, 86 and 87, the same being guided by the first four named sprockets in a path parallel to channel 75 and by sprockets 85, 86 and 87 along the right side of the harvester frame and transversely across the front of said frame, back to sprocket 81. At the entrance to the conveying mechanism, the end of channel member 75 preferably flares outwardly to engage and guide the stalks so that the same be gripped between said member and chain 80. The latter is preferably made of a series of links, each of which has a pair of lugs 88 formed therewith, said lugs of each link being vertically spaced and diverging in the direction of channel 75 to partially overlap the yielding member 79 (Fig. 5). Lugs 88 of successive links are spaced apart a sufficient distance to receive one or more cane stalks and move the latter at the same speed as the chain.

Each of the conveyor sprockets is preferably of a disk-type to prevent tangling of leaves and other foliage therewith and sprockets 82, 83, 84, 85 and 87 thereof are rotatably mounted on stub shafts which are carried by brackets fixed to parts of the harvester frame. Sprockets 81 and 86 are mounted in a novel manner in order to make possible an adjustment of the position of chain 80 relative to the leading end of channel 75 and, hence, the position of the mouth of the conveyor. As shown, a bearing member 89 (Figs. 6 and 7) carries sprocket 81, the latter being secured to said bearing member for rotation relative thereto by suitable means, such as a bolt 90. Bearing member 89 is slidably mounted on a track 91 for motion along a line substantially parallel to the straight portion of channel 75. In order to move said bearing member, a rod 92 is threadedly mounted in and extends through a flange 92a located along one edge of said track, said rod being secured at one end to bearing member 89 for rotation relative thereto and at the other end is provided with a crank 93 for facilitating rotation of said rod to produce linear movement of said bearing member. The latter movement changes the position of sprocket 81 in relation to the leading end of channel 75 and to take up the slack in chain 80 resulting from this movement or to produce the desired slack for such movement sprocket 86 is also adjustably mounted on a mechanism 94 similar to the means for mounting sprocket 81. Although sprocket 86 constitutes the take-up member for the movement of sprocket 81, it is to be understood that sprocket 87, for example, could also be utilized for this purpose. It is possible by means of the adjustable construction of sprocket 81 to insure that the stalks are gripped by the above conveying mechanism while being cut by the cutting means hereafter described, even though the stalks are inclined toward or away from the harvester in the direction of movement of the latter as said stalks approach the conveying mechanism.

Chain 80 is driven by suitable power means in a clockwise direction, as viewed in Fig. 4, at a linear speed substantially equal to the forward speed of the harvester so that after a stalk is picked up by the conveyor chain where the latter passes around sprocket 81 and is cut, it is carried rearwardly and upwardly relative to the tractor, being maintained in a relatively vertical position during its travel.

Means are provided for cutting the cane stalks close to the ground as the latter are gripped by the conveying means 79, 80 and, as shown, said cutting means comprises a rotary disk-like cutter 95 (Fig. 1), drive means 96 for transmitting rotary movement to said cutter and hydraulic means 97 for controlling the vertical height of the cutter relative to the ground. Drive means 96 comprises a stationary casing fixed to the supporting frame and preferably containing a gear drive keyed to cutter shaft 95a to impart rotary movement thereto but permitting axial movement of said shaft relative to said drive. The gear drive is actuated by power means to be more fully described hereafter. Shaft 95a is connected at its upper end to a bearing member 98 in which said shaft is free to rotate but which is adapted to transmit axial movement to the shaft. Bearing member 98 is, in turn, connected to hydraulic jack means 97 comprising a cylinder 99 and adapted to fix the elevation of cutter 95 relative to the ground by applying a hydraulic force upwardly on a piston connected by a rod 100 to said bearing member. A spring 101 normally under compression and positioned between an element fixed relative to cylinder 99 and a second element attached to bearing member 98 opposes the lifting action of hydraulic means 99 but yieldingly permits upward movement of cutter 95 in the event the latter strikes an obstacle.

After a stalk of cane has been cut by disk 95, the same is carried rearwardly and upwardly by conveyor chain 80 through additional novel stripping means which are effective to remove the leaves, vines, etc., from the lower end of the stalk. In the illustrated embodiment, said stripping means comprises a pair of resilient blades 102 and 103 (Figs. 1 and 3), preferably having the lower edges thereof relatively thin and secured to the harvester frame on each side of the path of movement of a cane stalk. The blades extend rearwardly and downwardly and are biased by their own resiliency so as to be normally in contact with each other for at least a part of their lengths. When a stalk is carried by conveyor 75, 80, it passes between and separates said blades, and the latter closely engage the entire lower surface of the stalk during the travel thereof since the stalk is first engaged intermediate the ends thereof and then moves in an upward as well as backward direction relative to the engaging blade surfaces. The blades are thus able to remove the foliage and any other matter which attaches to lower stalk surfaces. The conveyor also imparts a rotary movement to the stalks which assists the stripping means 102, 103 in removing the leaves.

After the above-described stripping operation, the stalk is carried in a substantially vertical position around sprocket 82 and transversely across the rear of the tractor. Novel means are provided for cutting and collecting the upper ends or nubbins of the stalks and are preferably located near the end of the conveying mechanism. As shown, said means comprise a rotating cutter 104 (Figs. 4, 8 and 9) having a hub portion 105 formed therewith, said hub portion carrying a member 106 provided with a plurality of curved radially extending arms or scoops 107 adapted to direct the severed stalk ends into a bin provided therefor. In order to efficiently remove the upper ends of stalks of crops of different heights, cutter 104 is adjustable in a vertical direction, hub 105 being keyed to a drive shaft 108 so as to be driven thereby and yet be free for axial movement. A sleeve 109 is mounted beneath cutter 104 for vertical axial movement relative to shaft 108, said sleeve being provided with a peripheral slot which is engaged by the bifurcated end of a lever 110. The latter is pivotally mounted at the other end thereof between a pair of supports or brackets 111 and 112 which are respectively attached to posts 39 and 30 (Figs. 4 and 12). A hydraulic jack 113 secured to the harvester frame engages lever 110 intermediate the ends thereof and controls the pivotal position of said lever, thereby fixing the vertical position of cutter 104. In order to suitably guide the cane stalk ends into cutting engagement with cutter 104, it is preferable to provide a pair of angularly disposed arms 114 and 115 beneath the cutter, said arms diverging on both sides of the path of movement of the stalks and preferably carried by sleeve 109. The nubbins, after being cut, are guided by vanes 107 into a chute 116 and by said chute into a bin 117 (Fig. 4), the latter being supported by frame 26.

Each stalk is carried to the end of conveyor 75, 80 and then permitted to fall on a conveying mechanism comprising a plurality of rearwardly and upwardly extending parallel supporting elements 118, three such elements being provided in the present embodiment. Said elements are centrally supported by brace 41 and the lower ends thereof are connected by a cross piece 41a which may be supported by frame member 29. Elements 118 are preferably channel-shaped for guiding conveyor chains 119, said chains being guided and driven by pairs of sprockets 120, 121 mounted at the ends of said elements. Sprockets 120 are mounted between supports 118a secured to the upper ends of elements 118 (Fig. 1). Sprockets 121 are mounted for rotation on a common drive shaft 122 journaled in bearings 123 fixed to rear beam 29. Chains 119 are provided with arms 124 which are adapted to extend perpendicularly therefrom a substantial distance beyond the upper edge of elements 118 and are adapted when said chains are driven in a counter-clockwise direction, as viewed in Fig. 1, to convey cane stalks supported by said elements to the upper ends thereof. The stalks are carried over the upper ends of element 118 and are dropped into a cane collecting cart or wagon 125 which is detachably secured to drawbar 48 by a connecting member 126. To obviate any danger of the stalks falling to the ground between chains 119 when released by conveyor 75, 80, a platform 125a (Fig. 1) is preferably provided beneath elements 118 and supported by braces 42, 43. An apron 119a is also supported by braces from posts 30 and 31 beneath conveyor 75, 80 to guide the stalks onto the conveyor.

A single prime mover, i. e., the engine of tractor T, is preferably employed for propelling the harvester and for actuating all of the power driven operating parts thereof. As shown, a sprocket 127 (Fig. 4) is mounted on a shaft 128 drivably connected to the tractor motor and a chain 129 transmits power from said sprocket to a sprocket 130 fixed to drive shaft 71, the latter, as heretofore pointed out, constituting the drive for stripper 65, 66. Shaft 71, which is mounted in bearings on frame F, is connected by a sprocket and chain drive 131 to drive means 96 for bottom cutter 95 and by a similar drive 132 to the bushing mechanism drive shaft 74, which is mounted in bearings on frame F. A third sprocket and chain drive 133 transmits power from shaft 71 to gathering chain drive 58a, the latter being connected to the former by a flexible coupling shown between numerals 58a and 71 in Fig. 1 and comprising a gear transmission for rotating sprocket 55a about an axis oblique to the axis of shaft 71. To operate gathering mechanism 50, a chain drive 134 is connected to drive 58 of said mechanism through a flexible coupling from shaft 74. To simplify the drawings and avoid confusion, the above drives and the locations thereof are diagrammatically illustrated in Figs. 10 and 12 by broken lines.

In order to actuate the nubbins cutter and the conveyor mechanisms, a power transmitting differential 135 (Fig. 12) is provided and consists of a gear box 135a having a main drive sprocket 136 which is operatively connected by a chain 137 to a sprocket 138 fixed to shaft 128 (Fig. 1). A shaft 139 extends upward from device 135 at right angles to the axis of rotation of sprocket 136, and is operatively connected by a flexible coupling 140 to sprocket 86 which is the drive member for conveying mechanism 75, 80. Shaft 108 of the nubbins cutting mechanism is also driven from shaft 139 by means of a gear train comprising two pairs of bevel gears 141, 142 connected by a shaft 143. At the lower end of device 135 still another pair of bevel gears 144 drivably connect said device to shaft 122.

In the operation of the harvester, tractor T is driven along the edge and to the left of the uncut part of the cane crop, preferably with the rear wheels thereof in the furrows of the field and with gathering mechanism 50, 50a astraddle the outer row of cane stalks. The power driven parts of the harvester are driven from the same power shaft as the tractor and the speed of operation of said parts is accordingly proportional to the forward speed of the harvester. The parts of the harvester may, of course, be driven by the tractor engine irrespective of whether the harvester is in motion over the ground. Gathering mechanisms 50, 50a first engage the cane stalks and raise the same laterally, if necessary, to an upright or nearly vertical position. While thus engaged by said mechanisms, the stalks have the foliage on the upper part thereof removed by stripper 65, 66 and by bushing cutter 72, 73.

The stalks are then guided into the conveying apparatus 75, 80 and each stalk as it is gripped between resilient member 79 and chain 80 is cut at or adjacent the root thereof by rotating cutter 95. The stalks are carried by said conveying mechanism in a substantially upright position along the side of the harvester and during this portion of the travel, each stalk is moved between and upwardly relative to the edges of bottom stripper 102, 103 whereby the foliage and any foreign matter attached to the lower half of the stalk are removed. The stalk is then conveyed transversely across the rear of the tractor to the right side thereof where the nubbins or top end is removed by cutter 104 and is directed into bin 117 by chute 116. At the end of channel member 75, the stalk is released and falls to a substantially horizontal position on the elevating conveyor 118, 124 which lifts it into cart 125 which is attached to draw-bar 48 of the tractor.

It is highly desirable when cutter 95 engages the stalk that the latter be gripped securely by conveyor 75, 80 and to make certain of this occurrence, the location of the conveyor entrance can be varied by moving sprocket 81 relative to the harvester substantially parallel to the path of travel of the harvester. This adjustment is effected by rotation of crank 93 which effects linear movement of bearing member 89 and sprocket 81 carried thereby. Compensation for the change in tautness of the chain is effected by moving idler sprocket 86, the latter being carried by a like adjustable mechanism. Thus, when the stalks are inclined from the vertical in the line of travel of the harvester, it is nevertheless possible, by moving sprocket 81 to insure that the stalks are gripped by the conveyor immediately prior to being engaged by cutter 95.

In some instances, it may be desirable to eliminate the harvesting conveyor and cane cart and to drop the harvested cane stalks on the ground in bunches to be picked up later by loaders of the type now in common use. When this is done, it is preferable to deposit harvested cane from more than one row in the same line along the field to thereby facilitate picking it up. To accomplish this purpose, the above-described harvester may be modified as shown in Figs. 13 and 14 wherein parts designated by primed numerals correspond in general to parts heretofore designated by the same numerals.

Figure 13:
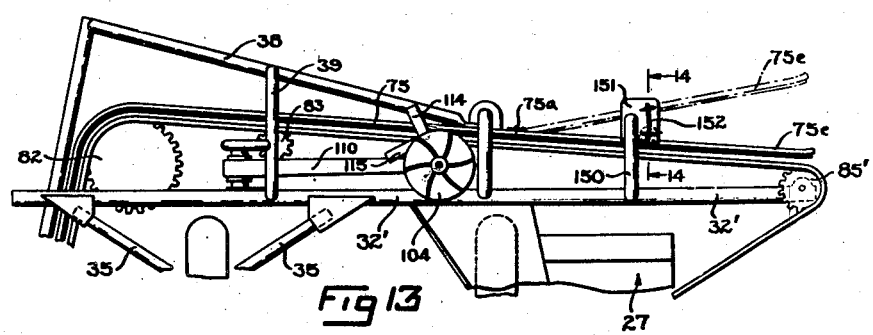
Fig. 13 is a detail top plan view, with parts broken away, showing a modification; and, Fig. 14 is an enlarged detail view, partly in section, the section being taken substantially on line 14—14 of Fig. 13.
Figure 14:
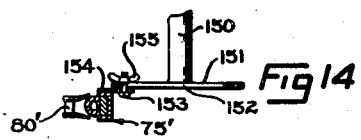

As illustrated in Fig. 13, frame member 32' is extended to the right of the harvester for supporting a sprocket 85' which drives extended conveyor chain 80'. An extension 75e for cooperation with the added length of chain 80' is hinged at 75a to the end of stationary portion 75 of the conveyor and is supported intermediate its ends by an arched frame member 150 that is rigidly secured at one end to frame member 32'. The other end of member 150 is provided with a horizontal plate 151 having a curved slot 152 therein for slidably receiving a bolt 153 which extends therethrough from a bracket 154 attached to extension 75e. The conveyor extension may thus be locked by tightening a wing nut 155 in either the full line or dotted line position indicated in Fig. 13. When extension 75e is in its dotted line position, the conveyor 75, 80' releases the upper ends of the cane stalks near hinge 75a, which stalks may be accumulated on a platform or the like (not shown) and deposited in bunches of suitable size along the field. When the next row of cane is being cut, extension 75e may be locked in full line position, so that the stalks will not be released and dropped on said platform until they reach a point near sprocket 85'. Preferably, the distance between hinge 75a and sprocket 85' is approximately equal to the distance between successive rows of cane so that the stalks of two successive rows may be dropped in the same places along the field. The platform on which the cane is dropped may be of any suitable construction such, for example, as that illustrated in applicant's Patent No. 2,281,904, dated May 5, 1942.

There is thus provided a novel harvester which is adapted for harvesting sugar cane and which is simple both in construction and operation, is light of weight and readily maneuverable and which is so constructed that all of the parts are readily accessible and visible at all times. Also, a mobile mechanical cane harvester is provided which effectively cuts the cane, strips the foliage therefrom, and cuts the top ends thereof, thereby preparing the stalks for immediate delivery to the sugar mill. Means are provided for collecting the nubbins so that the latter may be utilized as feed. It is possible to removably mount the harvester on a power driven vehicle, such as a tractor, so that the latter may be employed for other uses outside of the cane harvesting season. Additionally, the harvester embodies novel gathering, stripping, cutting and conveying means.

Although only a single embodiment of the invention has been illustrated and described in detail, it is to be expressly understood that the same is not limited thereto. Various changes may be made, for example, in the design and arrangement of the parts illustrated, as will now be apparent to those skilled in the art, without departing from the spirit and scope of the invention. For a definition of the limits of the invention, reference is had primarily to the appended claims.

What is claimed is:

1. In a harvester for plants having stalks, means for cutting the stalks of a single row as the harvester moves through the field, and conveying means constructed and arranged to grip and convey the severed stalks in a substantially upright position to and across the rear of the harvester and comprising discharge means having a release element operable to release the stalks at different places, whereby the stalks cut from two successive rows may be deposited in a single row along the field.

2. In a harvester for cane stalks, cutting means for severing said stalks adjacent the roots thereof, and conveying means for gripping and carrying said stalks in an upright position to and beyond said cutting means, said conveying means comprising a channel member fixed to the harvester, yielding means secured in said channel member, an endless chain having prongs extending therefrom and straddling said yielding means, means for mounting said chain substantially parallel to said member, and means for moving said chain relative to said member.

3. In a harvester for plants having stalks, conveying means for carrying said stalks in a relatively upright position, said means comprising elongated means fixed to the harvester, yieldable means secured to said elongated means, an endless chain having prongs extending therefrom and overlapping said yieldable means at opposite sides thereof, means for mounting said chain for movement parallel to and longitudinally of said elongated means, and means for moving said chain.

4. In a harvester for plants having stalks, means for conveying said stalks comprising elongated yieldable means stationarily mounted on said harvester, endless movable means having prongs adapted to straddle said yieldable means, and means for moving said movable means longitudinally of and parallel to said yieldable means.

5. In a harvester for plants having stalks growing in substantially parallel rows, means for cutting the stalks of a single row as the harvester moves through the field, and conveying means for gripping and conveying the severed stalks in a substantially upright position laterally relative to the direction of motion of the harvester, said conveying means including means whereby the extent of the lateral movement of said stalks by said conveying means may be varied at the will of the operator.

6. Power driven apparatus for harvesting row cultivated plants, said apparatus having means for gathering the plants in a single row and delivering them to a conveyor constituted by an endless chain carrying spaced lugs, and an elongated member adapted to coact with the chain and to engage and convey the stalks in an upright position to and past stalk cutting means, the combination with said chain of sprockets for guiding and driving the chain, and means for moving one or more of said sprockets to vary the position of the mouth of the conveyor relative to the stalk cutting means.

7. In a power driven harvester for plants having stalks, said harvester being of the type having a conveying means comprising an endless chain, and an elongated member paralleling said chain for a portion of the length of the latter, said elongated member being adapted to coact with the chain to grip the stalks therebetween and convey the same to a discharge point adjacent the rear of the harvester, the combination therewith of a second elongated member selectively operable and mounted at the discharge end of the conveyor and coacting with said chain to convey the stalks to a point spaced laterally from the normal discharge point of the conveyor, whereby the stalks may be released at different points.

ALLAN R. WURTELE.

REFERENCES CITED

The following references are of record in the file of this patent:

UNITED STATES PATENTS

| Number | Name | Date |
|---|---|---|
| 22,824 | Persons et al. | Feb. 1, 1859 |
| 94,141 | Sisum | Aug. 24, 1869 |
| 156,487 | Lewis | Nov. 3, 1874 |
| 268,381 | Beebe | Dec. 5, 1882 |
| 289,144 | Rumrill | Nov. 27, 1883 |
| 420,329 | Bovee | Jan. 28, 1890 |
| 435,238 | McCollister et al. | Aug. 26, 1890 |
| 624,878 | Sharp | May 9, 1899 |
| 641,288 | Gray | Jan. 16, 1900 |
| 681,147 | Stone | Aug. 20, 1901 |
| 1,176,437 | Deason | Mar. 21, 1916 |
| 1,233,418 | Stone | July 17, 1917 |
| 1,365,213 | Woodland | Jan. 11, 1921 |
| 1,572,410 | Paine | Feb. 9, 1926 |
| 1,629,776 | Cutler | May 24, 1927 |
| 1,666,824 | Johnson | Apr. 17, 1928 |
| 1,792,691 | Harris et al. | Feb. 17, 1931 |
| 2,134,867 | Fergason | Nov. 1, 1938 |
| 2,186,655 | Rehn et al. | Jan. 9, 1940 |
| 2,210,341 | Rund | Aug. 6, 1940 |
| 2,281,904 | Wurtele | May 5, 1942 |